US 12,445,053 B2

(12) United States Patent
Nam et al.

(10) Patent No.: US 12,445,053 B2
(45) Date of Patent: Oct. 14, 2025

(54) SWITCHING REGULATOR AND POWER MANAGEMENT INTEGRATED CIRCUIT INCLUDING THE SAME

(71) Applicant: Samsung Electronics Co., Ltd., Suwon-si (KR)

(72) Inventors: Hyun Seok Nam, Suwon-si (KR); Jeong Woon Kong, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 221 days.

(21) Appl. No.: 18/332,454

(22) Filed: Jun. 9, 2023

(65) Prior Publication Data
US 2024/0088788 A1 Mar. 14, 2024

(30) Foreign Application Priority Data

Sep. 8, 2022 (KR) .................. 10-2022-0114267
Oct. 31, 2022 (KR) .................. 10-2022-0142735

(51) Int. Cl.
*H02M 3/158* (2006.01)
*H02H 1/00* (2006.01)
(Continued)

(52) U.S. Cl.
CPC .......... *H02M 3/158* (2013.01); *H02H 1/0007* (2013.01); *H02H 7/1213* (2013.01); *H02M 1/088* (2013.01)

(58) Field of Classification Search
CPC ... H02M 3/158; H02H 7/1213; H02H 1/0007; H02H 1/088
(Continued)

(56) References Cited

U.S. PATENT DOCUMENTS 6,771,052 B2   8/2004   Ostojic
7,307,412 B1  12/2007   Broach
(Continued)

FOREIGN PATENT DOCUMENTS

JP   2000/060115 A   2/2000
JP   2002/262557 A   9/2002
(Continued)

OTHER PUBLICATIONS

Extended European Search Report issued Feb. 20, 2024 in European Application No. 23196210.1.

*Primary Examiner* — Yemane Mehari
(74) *Attorney, Agent, or Firm* — Harness, Dickey & Pierce, P.L.C.

(57) ABSTRACT

A switching regulator is provided. The switching regulator comprises a switching controller configured to activate a switching conversion operation based on an enable signal, a gate driver configured to generate first and second gate signals under control of the switching controller and a switching circuit configured to convert an input voltage applied to an input voltage node to a output voltage. The switching circuit includes a P-type transistor connected between the input voltage node and a switching node and gated based on the first gate signal, an N-type transistor connected between the switching node and a power ground terminal and gated based on the second gate signal and an inductor connected between the switching node and an output node and configured to output the output voltage.

20 Claims, 21 Drawing Sheets

(51) Int. Cl.
*H02H 7/12* (2006.01)
*H02M 1/088* (2006.01)

(58) Field of Classification Search
USPC .......................................................... 323/344
See application file for complete search history.

(56) References Cited

U.S. PATENT DOCUMENTS

| | | | |
|---|---|---|---|
| 7,940,030 B2 | 5/2011 | Cannella et al. | |
| 7,940,507 B2 | 5/2011 | Fukushi et al. | |
| 9,548,652 B2 | 1/2017 | Cao et al. | |
| 11,264,977 B1 | 3/2022 | Choi et al. | |
| 2004/0169498 A1* | 9/2004 | Goder | H02M 1/36 |
| | | | 323/222 |
| 2014/0191744 A1* | 7/2014 | Choi | H02M 3/158 |
| | | | 323/283 |
| 2014/0292292 A1* | 10/2014 | Koski | H02H 7/1213 |
| | | | 323/271 |
| 2017/0288548 A1* | 10/2017 | Childs | H02M 3/1588 |
| 2018/0294724 A1* | 10/2018 | Mehdi | G05F 1/62 |
| 2020/0201408 A1 | 6/2020 | Lehwalder et al. | |

FOREIGN PATENT DOCUMENTS

| | | |
|---|---|---|
| JP | 2010/199490 A | 9/2010 |
| JP | 4890182 B2 | 3/2012 |
| JP | 6734732 B2 | 8/2020 |
| KR | 10-2005-0105989 A | 11/2005 |
| KR | 10-2006-0131900 A | 12/2006 |

* cited by examiner

SWITCHING REGULATOR AND POWER MANAGEMENT INTEGRATED CIRCUIT INCLUDING THE SAME

CROSS-REFERENCE TO RELATED APPLICATION

This application claims priority from Korean Patent Application No. 10-2022-0114267 filed on Sep. 8, 2022 and No. 10-2022-0142735 filed on Oct. 31, 2022 in the Korean Intellectual Property Office, and all the benefits accruing therefrom under 35 U.S.C. 119, the contents of which are herein incorporated by reference in their entirety.

BACKGROUND

Field

The present disclosure relates to a switching regulator and a power management integrated circuit including the same.

Description of Related Art

A supply voltage may be generated to provide power to electronic components. In order to reduce power consumption by the electronic components, a level of the supply voltage provided to the electronic components may be changed. For example, when a relatively low performance of a digital circuit that processes a digital signal is desired, a lower level of the supply voltage may be provided thereto, whereas when a relatively high performance thereof is desired, a higher level of the supply voltage may be provided thereto. Accordingly, a switching regulator capable of generating various levels of the supply voltage may be used.

SUMMARY

The present disclosure provides a switching regulator stably operating in power-off, and a power management integrated circuit including the same.

The present disclosure is not limited to the above-mentioned. Purposes and advantages of the present disclosure that are not mentioned may be understood based on following descriptions, and may be more clearly understood based on example embodiments according to the present disclosure. Further, it will be easily understood that the purposes and advantages according to the present disclosure may be realized using means shown in the claims and combinations thereof.

One example embodiment of the present disclosure provides a switching regulator comprising a switching controller configured to activate a switching conversion operation based on an enable signal, a gate driver configured to generate first gate signal and a second gate signal under control of the switching controller and a switching circuit configured to convert an input voltage applied to an input voltage node to an output voltage. The switching circuit includes a P-type transistor connected between the input voltage node and a switching node and gated based on the first gate signal, an N-type transistor connected between the switching node and a power ground terminal and gated based on the second gate signal and an inductor connected between the switching node and an output node and configured to output the output voltage, wherein in response to a protective operation event occurring in the switching regulator, the switching controller is configured to detect a direction of a current of the inductor, stop a switching operation of the switching circuit, discharge a residual current of the inductor, and entirely turn off the switching regulator.

output voltage, wherein in response to a protective operation event occurring in the switching regulator, the switching controller is configured to detect a direction of a current of the inductor, stop a switching operation of the switching circuit, discharge a residual current of the inductor and entirely turn off the switching regulator.

Another example embodiment of the present disclosure provides a switching regulator comprising a switching controller configured to be activated based on an enable signal and a switching circuit including a P-type transistor and an N-type transistor, the switching circuit configured to convert an input voltage to a target output voltage under control of the switching controller, wherein the switching controller is configured to: monitor whether a protective operation event occurs, detect a direction of a current of an inductor of the switching circuit in response to the protective operation event occurring, stop a switching operation of the switching circuit, fully turn on the P-type transistor or the N-type transistor based on the detected direction and deactivate the enable signal in response to the current of the inductor having been fully discharged.

Other example embodiment of the present disclosure provides a power management integrated circuit comprising a power supply configured to generate an input voltage based on an external voltage, a digital logic configured to generate an enable signal based on monitoring signals, a switching regulator configured to convert the input voltage to an output voltage based on the enable signal, and to output the monitoring signals, wherein the switching regulator is configured to: monitor whether a protective operation event occurs, detect a direction of a current of an inductor of a switching circuit of the switching regulator when the protective operation event occurs, stop a switching operation of the switching circuit, discharge a residual current of the inductor; and turn off the switching regulator.

BRIEF DESCRIPTION OF DRAWINGS

The above and other features of the present disclosure will become more apparent by describing in detail illustrative example embodiments thereof with reference to the attached drawings, in which.

DETAILED DESCRIPTIONS

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

It will be understood that, although the terms "first", "second", "third", and so on may be used herein to illustrate various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In descriptions of temporal relationships, for example, temporal precedent relationships between two events such as "after", "subsequent to", "before", etc., another event may occur therebetween unless "directly after", "directly subsequent" or "directly before" is not indicated. The features of the various example embodiments of the present disclosure may be partially or entirely combined with each other, and may be technically associated with each other or operate with each other.

Hereinafter, with reference to the accompanying drawings, example embodiments according to the technical idea of the present disclosure will be described.

Figure 1:
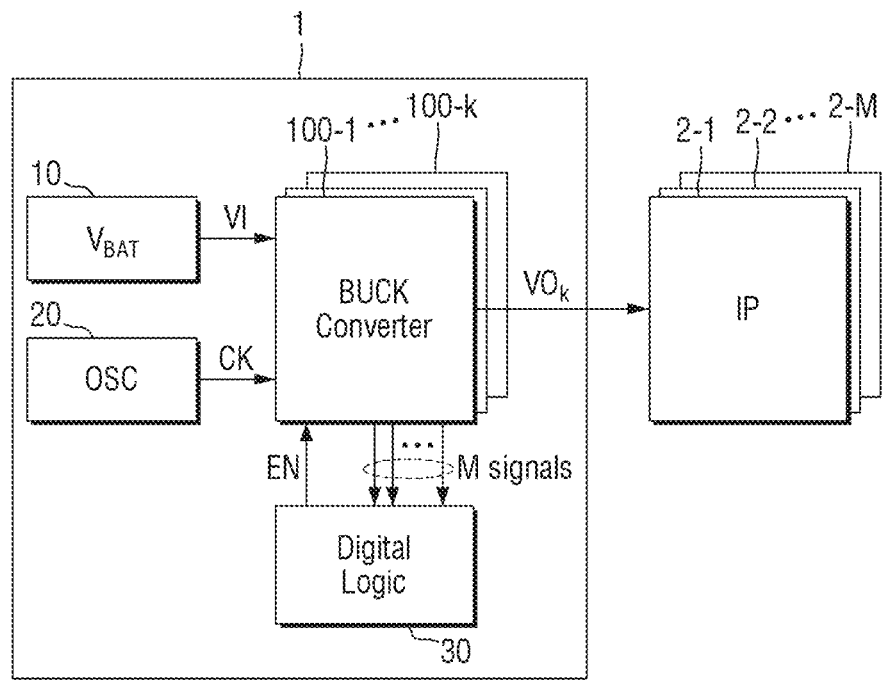
FIG. 1 is a schematic diagram for illustrating a PMIC according to some example embodiments.

FIG. 1 is a schematic diagram for illustrating a PMIC according to some example embodiments.

Referring to FIG. 1, a power management integrated circuit 1 (hereinafter, referred to as PMIC) includes a power supply 10 that supplies an external voltage or battery voltage VBAT as an input voltage VI, an oscillator 20 that generates a clock CLK, a switching regulator 100-1 to 100-k (hereafter, denoted as 100), and a digital logic 30.

The switching regulator 100 converts the input voltage VI to an output voltage VO corresponding to an internal component (for example, an intellectual property (hereinafter, referred to as IP) 2-1 to 2-M (hereinafter, denoted as 2) according to the clock CLK and an enable signal EN and outputs the output voltage VO. In the illustrated example, the switching regulator is implemented as a buck converter circuit. In another example, the switching regulator may be implemented as a boost converter circuit or a buck-boost converter circuit according to various example embodiments.

The digital logic 30 may output a signal that controls an operation of components in the PMIC 1. For example, the digital logic 30 may output the enable signal EN to activate an operation of the switching regulator 100. The enable signal EN may be a signal determined based on monitoring signals (M signals) received from the switching regulator 100.

Figure 2:
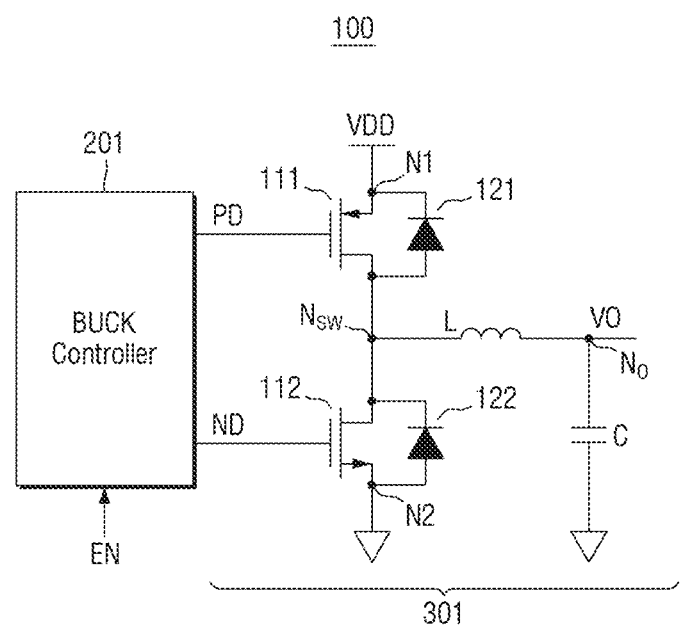
FIG. 2 shows a case where the switching regulator is embodied as a buck converter circuit.
Figure 3A:
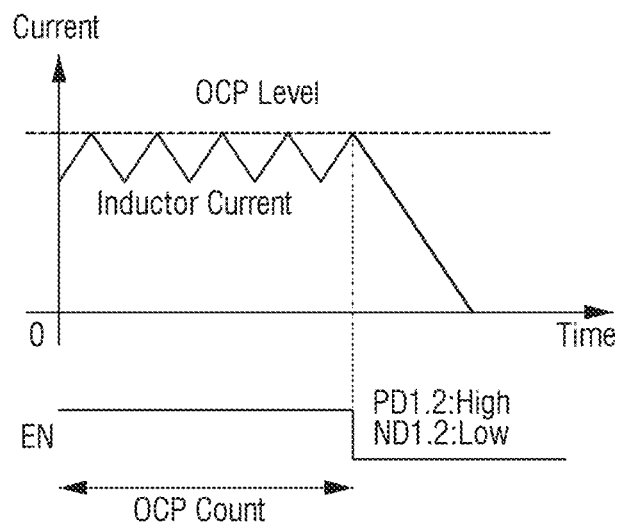
FIG. 3A is a timing diagram to illustrate an operation of the switching regulator of FIG. 2 in a positive overcurrent state.
Figure 3B:
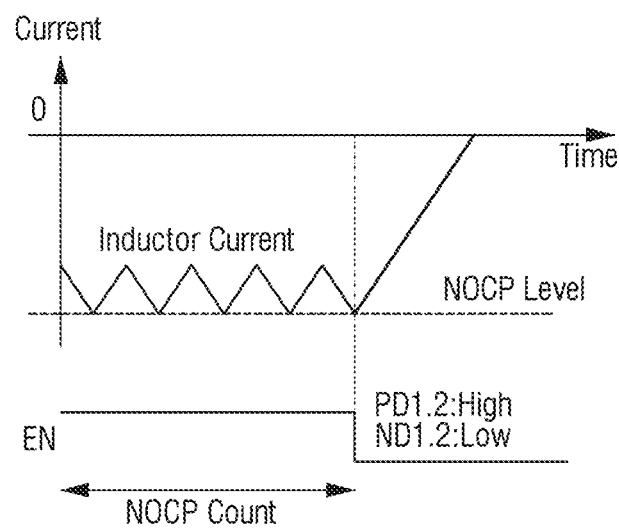
FIG. 3B is a timing diagram to illustrate an operation of the switching regulator of FIG. 2 in a negative overcurrent state.
Figure 4:
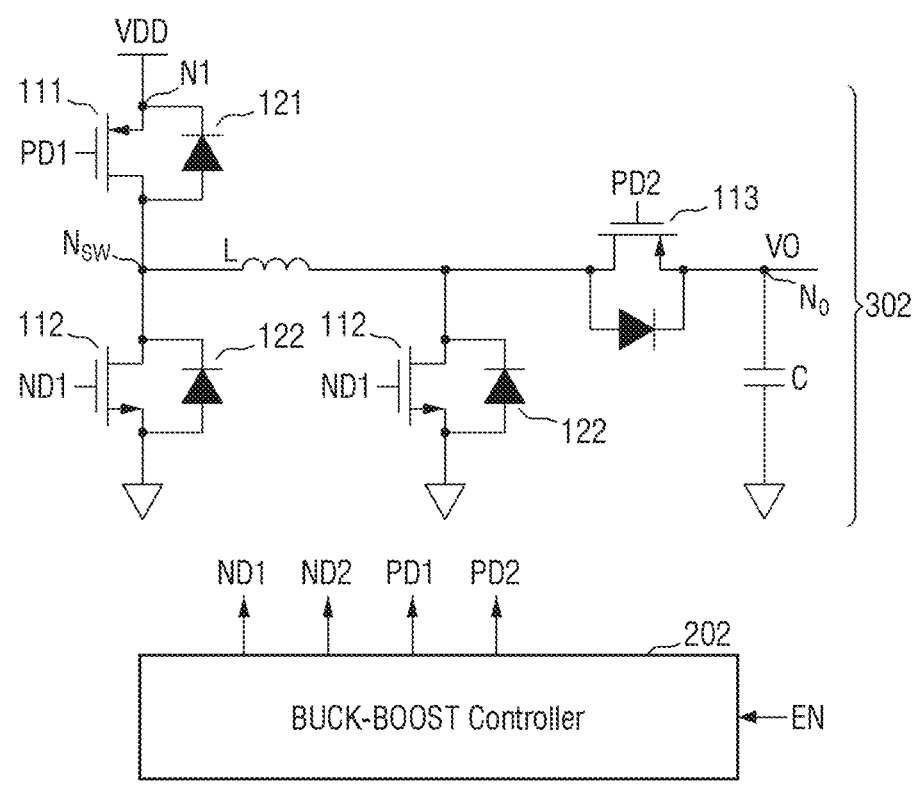
FIG. 4 shows a case where the switching regulator is embodied as a buck-boost converter circuit.

FIG. 2 to FIG. 4 is a circuit diagram briefly showing a switching regulator. FIG. 2 shows a case where the switching regulator is embodied as a buck converter circuit.

Referring to FIG. 2, the switching regulator 100 includes a buck controller 201 and a switching circuit 301. The buck controller 201 is activated according to the enable signal EN received from the digital logic 30, and thus outputs gate signals PD and ND. The switching circuit 301 generates the output voltage VO according to the gate signals PD and ND.

The switching circuit 301 may include a P-type transistor 111, an N-type transistor 112 and an inductor L. The P-type transistor 111 and the N-type transistor 112 have body diodes 121 and 122, respectively.

The P-type diode 121 may be a parasitic diode or an internal diode formed via a PN junction between a source and a drain of the P-type transistor 111. The N-type diode 122 may be a parasitic diode or an internal diode formed via a PN junction between a source and a drain of the N-type transistor 112. The first gate signal PD is applied to a gate of the P-type transistor 111. The P-type transistor 111 is connected to and disposed between a power supply voltage (VDD) terminal and a switching node $N_{SW}$. The N-type transistor 112 is connected to and disposed between the switching node $N_{SW}$ and a ground voltage terminal, while the second gate signal ND is applied to a gate of the N-type transistor 112. The inductor L is connected to and disposed between the switching node $N_{SW}$ and an output node $N_O$. The switching circuit 301 may further include a load capacitor C connected to the output node $N_O$.

FIG. 3A is a timing diagram to illustrate an operation of the switching regulator of FIG. 2 in a positive overcurrent state, and FIG. 3B is a timing diagram to illustrate an operation of the switching regulator of FIG. 2 in a negative overcurrent state.

A case in which the buck controller 201 outputs the gate signals PD and ND so that all transistors of the switching circuit 301 are turned off in the positive overcurrent or negative overcurrent state to turn off the P-type transistor 111 and turn off the N-type transistor 112 is described.

Referring to FIG. 2 and FIG. 3A, when positive overcurrent occurs, an inductor current remaining in the inductor L is discharged through the N-type body diode 122. Referring specifically to FIG. 3A, the inductor L detects the inductor current in a counter-based manner (OCP count). When the inductor current maintains a positive overcurrent level (OCP level) for a predefined (or alternatively, desired) time duration, the buck controller 201 recognizes a situation in which the overcurrent lasts, and thus deactivates the enable signal EN. When the enable signal EN is deactivated, the buck controller 201 outputs the first gate signal PD of a logic high and the second gate signal ND of a logic low, so that the P-type transistor 111 and the N-type transistor 112 are turned off.

When negative overcurrent occurs, the inductor current is discharged through the P-type body diode 121. Referring specifically to FIG. 3B, the inductor L detects the inductor current in a counter-based manner (NOCP count). When the inductor current maintains the negative overcurrent level (NOCP level) for a predefined (or alternatively, desired) time duration, the buck controller 201 recognizes a situation in which the overcurrent lasts, and thus deactivates the enable signal EN. When the enable signal EN is deactivated, the buck controller 200 outputs the first gate signal PD of a logic high and the second gate signal ND of a logic low, thereby turning off the P-type transistor 111 and the N-type transistor 112.

In the discharging operation of the switching circuit 301, a large current is discharged through the body diode 121 or 122 of the P-type transistor 111 or the N-type transistor 112. At this time, the PMIC 1 may overheat momentarily. Thus, when a temperature thereof exceeds a predetermined (or alternatively, desired) temperature, the PMIC 1 may be damaged.

FIG. 4 shows a case where the switching regulator is embodied as a buck-boost converter circuit.

Referring to FIG. 4, the switching regulator 100 includes a buck-boost controller 202 and a switching circuit 302. The buck-boost controller 202 is activated according to the enable signal EN received from the digital logic 30, and thus outputs gate signals PD1, PD2, ND1, and ND2. The switching circuit 302 generates the output voltage VO according to the gate signals PD1, PD2, ND1, and ND2.

The switching circuit 302 may include two P-type transistors 111 and 113, two N-type transistors 112 and 114 and an inductor L. The P-type transistor 111 and the N-type transistor 112 are connected in series with and disposed between a power supply terminal VDD and a power ground terminal. The inductor L is connected to and disposed between a switching node $N_{SW}$ and a source terminal of the P-type transistor 113. The N-type transistor 114 is connected to and disposed between the source terminal of the P-type transistor 113 and the power ground terminal. The P-type transistor 113 is connected to and disposed between one end of the inductor L and an output node No. The first gate signal PD1 is applied to a gate of the P-type transistor 111, the second gate signal ND1 is applied to a gate of the N-type transistor 112, the third gate signal PD2 is applied to a gate of the P-type transistor 113, and the fourth gate signal ND2 is applied to a gate of the N-type transistor 114. The two P-type transistors 111 and 113 and the two N-type transistors 112 and 114 have body diodes 121, 122, 123, and 124, respectively. The switching circuit 302 may further include a load capacitor C connected to the output node No.

The positive overcurrent situation will be described with reference to FIG. 4 and FIG. 3A. When the inductor current maintains the positive overcurrent level (OCP level) for a predefined (or alternatively, desired) time duration, the buck controller 201 outputs each of the gate signals PD1 and PD2 of a logic high and each of the gate signals ND1 and ND2 of a logic low to turn off the switching circuit 303. In the positive overcurrent situation, the inductor current is discharged through the N-type body diode 122 and the P-type body diode 124. The negative overcurrent situation with will be described reference to FIG. 4 and FIG. 3B, When the inductor current maintains the negative overcurrent level (NOCP level) for a predefined (or alternatively, desired) time duration, the buck controller 201 outputs each of the gate signals PD1 and PD2 of a logic high and each of the gate signals ND1 and ND2 of a logic low to turn off the switching circuit 303. In this case, the inductor current is discharged through the N-type body diode 123 and the P-type body diode 121.

In the discharging operation of the switching circuit 302, a large current is discharged through the body diode 121 or 122 of the P-type transistors 111 and 113 or the N-type transistors 112 and 114. At this time, the PMIC 1 may overheat momentarily. Thus, when a temperature thereof exceeds a predetermined (or alternatively, desired) temperature, the PMIC 1 may be damaged.

Figure 5:
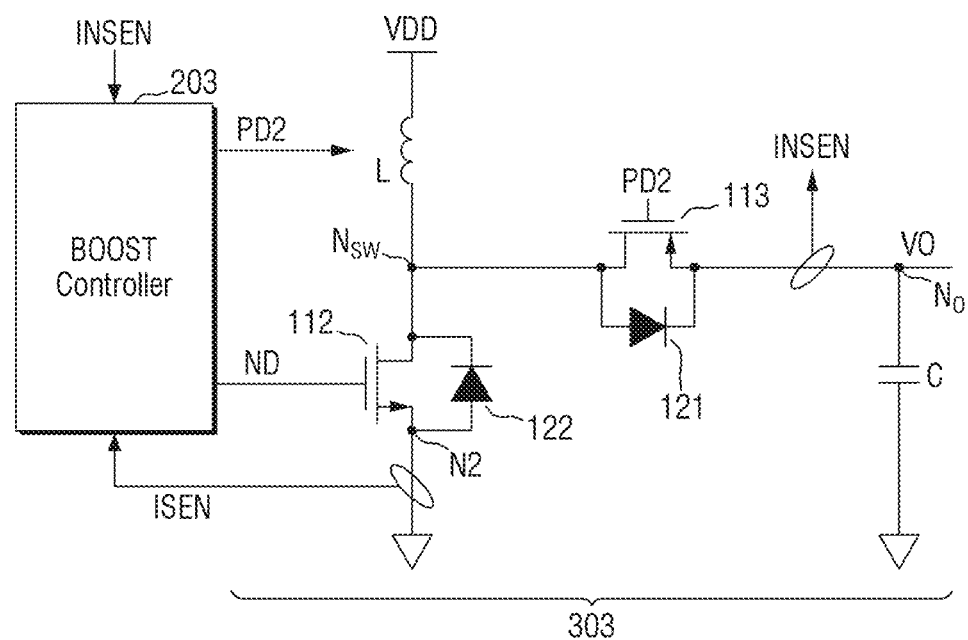
FIG. 5 shows a case where the switching regulator is embodied as a boost converter circuit.

FIG. 5 shows a case where the switching regulator is embodied as a boost converter circuit.

Referring to FIG. 5, the switching regulator 100 includes a boost controller 203 and a switching circuit 303. The boost controller 203 is activated according to the enable signal EN received from the digital logic 30, and thus outputs gate signals PD2 and ND. The switching circuit 303 generates the output voltage VO according to the gate signals PD2 and ND. The boost controller 203 may monitor each of (or alternatively, at least one of) a current ISEN of a source terminal (N2 node) of a N-type transistor 112 and a current INSEN of a source terminal ($N_0$ node) of a P-type transistor 113, and may adjust the gate signals PD2 and ND based on the monitored currents.

The switching circuit 303 may include the P-type transistor 113, the N-type transistor 112 and an inductor L. The inductor L and the N-type transistor 112 are connected in series with and disposed between the power supply terminal VDD and the power ground terminal. The P-type transistor 113 is connected to and disposed between a switching node $N_{SW}$ and an output node Vo. The first gate signal PD2 is applied to a gate of the P-type transistor 113 and a second gate signal ND is applied to a gate of the N-type transistor 112. The P-type transistor 113 and the N-type transistor 112 have body diodes 121 and 122, respectively. The switching circuit 303 may further include a load capacitor C connected to the output node No.

The positive overcurrent situation will be described with referring to FIG. 5 and FIG. 3A. In the positive overcurrent situation, the inductor current is discharged toward the output node $N_0$ through the P-type body diode 121. The negative overcurrent situation will be described with referring to FIG. 5 and FIG. 3B. When the negative overcurrent occurs, the inductor current is discharged through the N-type body diode 122.

In the discharging operation of the switching circuit 302, a large current is discharged through the body diode 121 or 122 of the P-type transistor 113 or the N-type transistor 112. At this time, the PMIC 1 may overheat momentarily. Thus, when a temperature thereof exceeds a predetermined (or alternatively, desired) temperature, the PMIC 1 may be damaged.

Figure 6A:
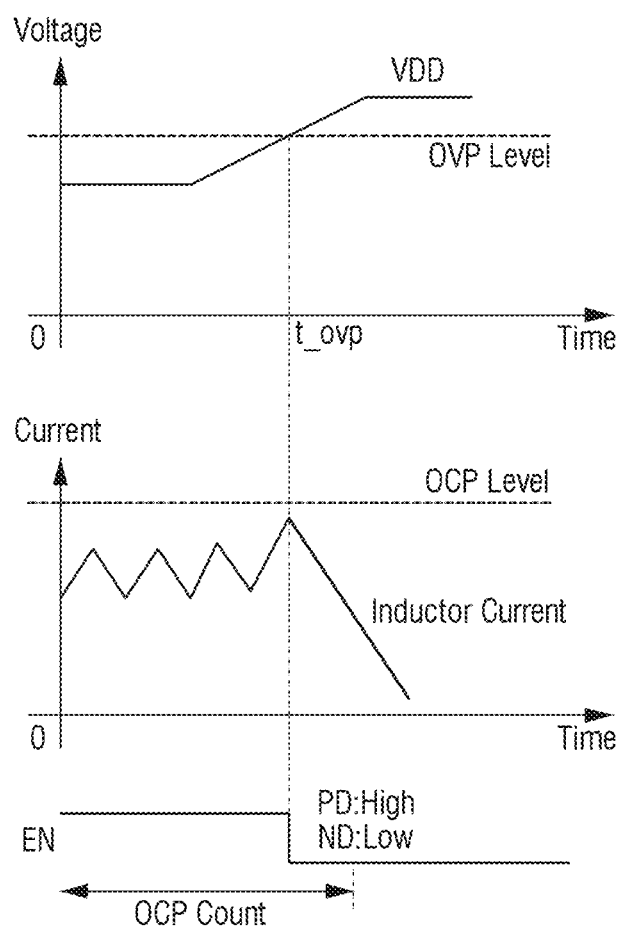
FIG. 6A is a timing diagram to illustrate an operation of the switching regulator in an overvoltage-positive overcurrent state.
Figure 6B:
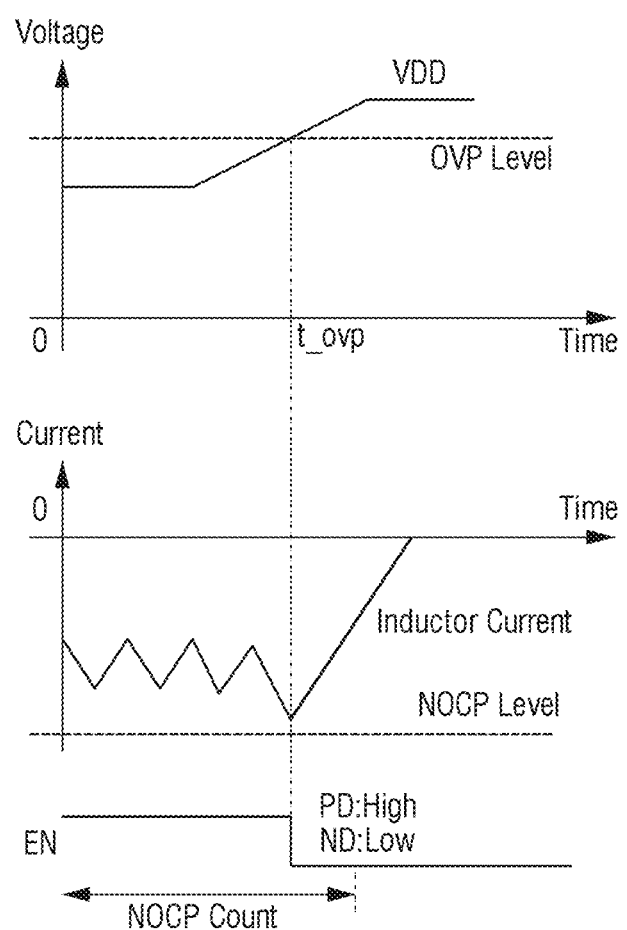
FIG. 6B is a timing diagram to illustrate an operation of the switching regulator in an overvoltage-negative overcurrent state.

FIG. 6A is a timing diagram to illustrate an operation of the switching regulator in an overvoltage-positive overcurrent state. FIG. 6B is a timing diagram to illustrate an operation of the switching regulator in an overvoltage-negative overcurrent state.

When each of the switch controllers 201, 202, and 203 in FIG. 2, FIG. 4 and FIG. 5 (hereinafter, collectively denoted as 200) recognizes an overvoltage state, the switch controller 200 controls the gate signals PD and ND so that all of the transistors of each of the switching circuits 301, 302, and 303 in FIG. 2, FIG. 4 and FIG. 5 (hereinafter, collectively denoted as 300) are turned off. For example, a case in which the switch controller outputs the gate signal PD of a logic high to turn off the P-type transistor 111 and outputs the gate signal ND of a logic low to turn off the N-type transistor 112 will be described.

Referring to FIG. 3 and a voltage graph of FIG. 6A, when a voltage of a source terminal of the P-type transistor 111, that is, the power supply voltage VDD exceeds a normal range at a certain time point t_ovp (VDD>OVP level), and the inductor current is out of a normal range as shown in a current graph of FIG. 6A, that is, the inductor current is significantly lower than a positive overcurrent protection level (OCP level), the switching regulator 100 should be turned off immediately (EN=Low) for operational reliability.

Similarly, referring to a voltage graph of FIG. 6B, when the source terminal of the P-type transistor 111, that is, the power supply voltage VDD exceeds the normal range (that is, exceeds an overvoltage range) at a certain point in time t_ovp (VDD>OVP level), and the inductor current is out of the normal range as shown in a current graph of FIG. 6B (that is, is significantly lower than a negative overcurrent protection level (NOCP level), the switching regulator 100 should be turned off (EN=Low) immediately.

To protect the switching regulator 100, the digital logic 30 may monitor the power supply voltage VDD and the inductor current, and may adjust the enable signal EN according to the monitoring result. That is, in an overvoltage (OVP) or positive overcurrent (OCP) situation, the digital logic 30 may inactivate the enable signal EN, and may set the first gate signal PD to a logic high and the second gate signal ND to a logic low to turn off the switching circuit 300.

Figure 7A:
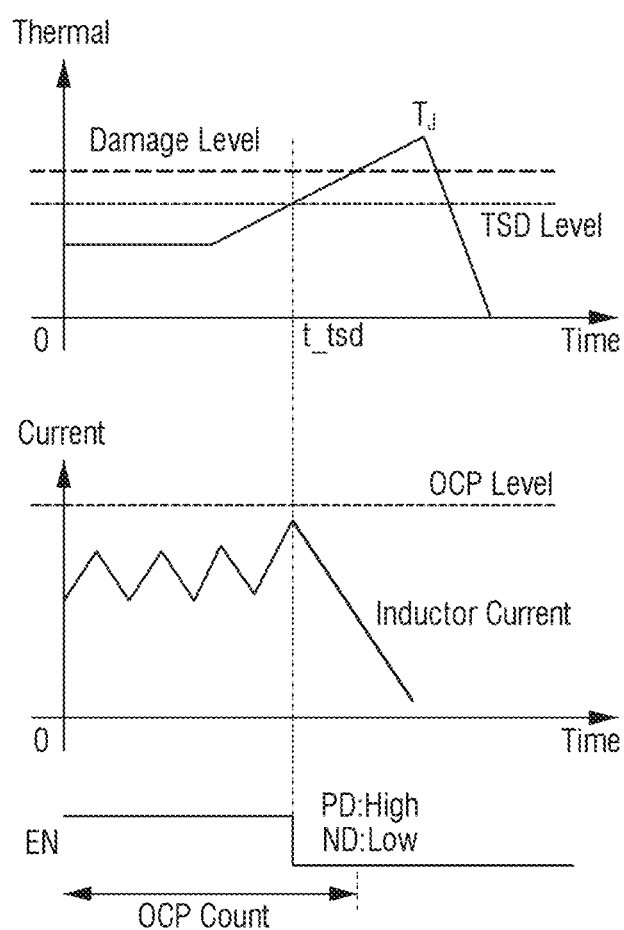
FIG. 7A and FIG. 7B are timing diagrams showing an operation of a switching regulator circuit when operating at a high temperature due to overheating in a positive overcurrent or negative overcurrent situation.
Figure 7B:
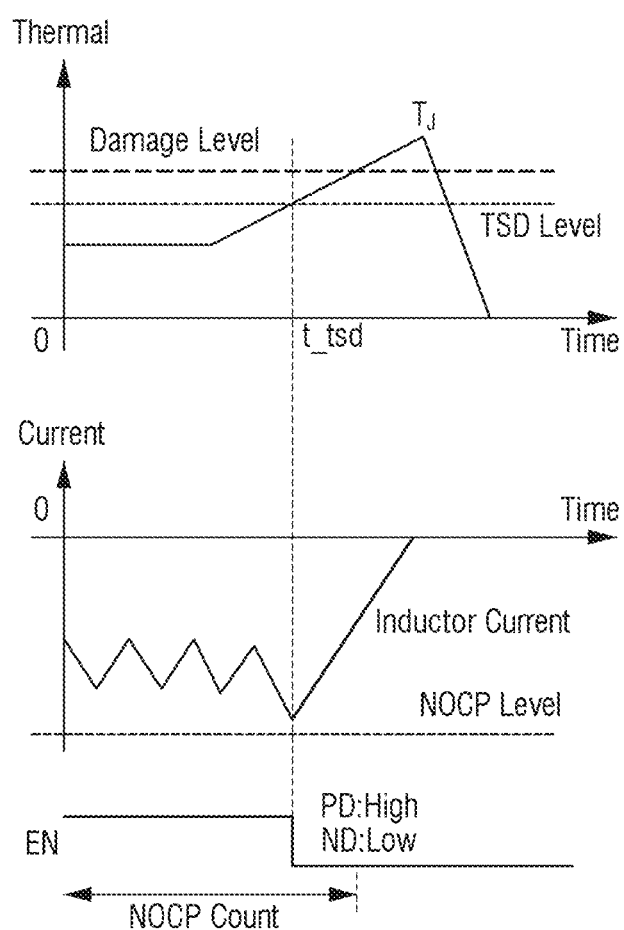

FIG. 7A and FIG. 7B are timing diagrams showing an operation of a switching regulator circuit when operating at a high temperature due to overheating in a positive overcurrent or negative overcurrent situation.

Referring to FIG. 7A, when the positive overcurrent OCP occurs in the switching regulator 100, the positive overcurrent is discharged to the P-type or N-type body diode as described in FIG. 2, FIG. 4 or FIG. 5 such that a temperature of the switching regulator 100 increases due to thermal resistance. Thus, the switching regulator 100 overheats to a temperature equal to or higher than a predefined (or alternatively, desired) threshold temperature (TSD level) at a certain point in time t_tsd. At this time, even though the switching regulator 100 is immediately turned off under an overcurrent protection operation (EN oft), the switching regulator 100 may be turned off before the positive overcurrent is entirely discharged, so that a residual current may be discharged through the body diode.

Referring to FIG. 7B, when the negative overcurrent NOCP occurs in the switching regulator 100, the negative overcurrent is discharged to the P-type or N-type body diode as described in FIG. 2, FIG. 4 or FIG. 5 such that a temperature of the switching regulator 100 increases due to thermal resistance. Specifically, the switching regulator 100 overheats to a temperature equal to or higher than the predefined (or alternatively, desired) threshold temperature (TSD level) at a certain point in time t_tsd. At this time, even though the switching regulator 100 is immediately turned off under a negative overcurrent protective operation (EN oft), the switching regulator 100 may be turned off before the negative overcurrent is entirely discharged, so that a residual current may be discharged through the body diode.

Thus, when the residual current continues to be discharged, the temperature of the switching regulator 100 may continue to rise up to a temperature equal to or higher than the threshold temperature and may exceed a damage level ($T_j$>Damage Level). This may damage the PMIC 1 including the switching regulator 100.

Figure 8:
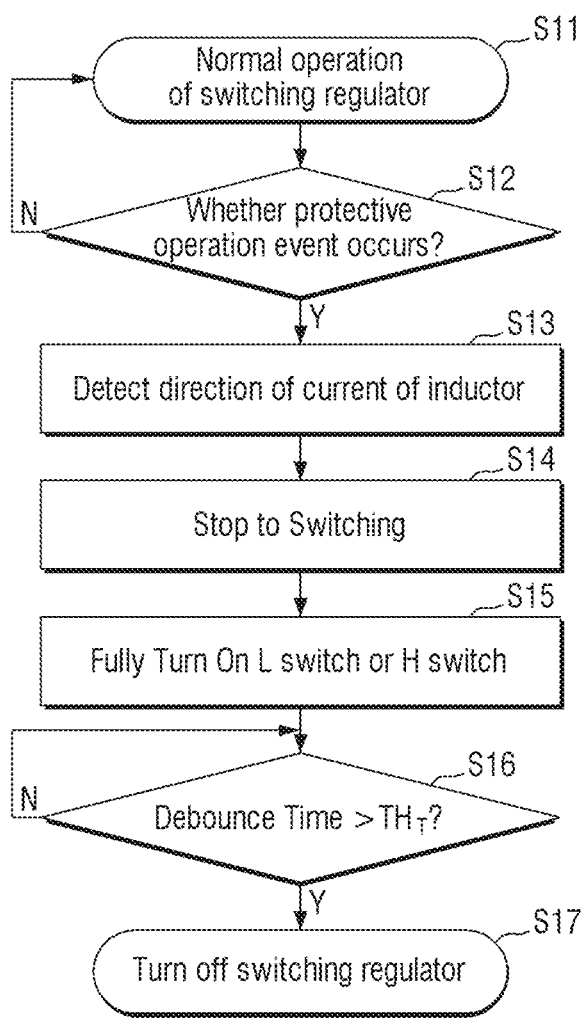
FIG. 8 and FIG. 9 are flowcharts illustrating a method of operating a switching regulator according to some example embodiments.
Figure 9:
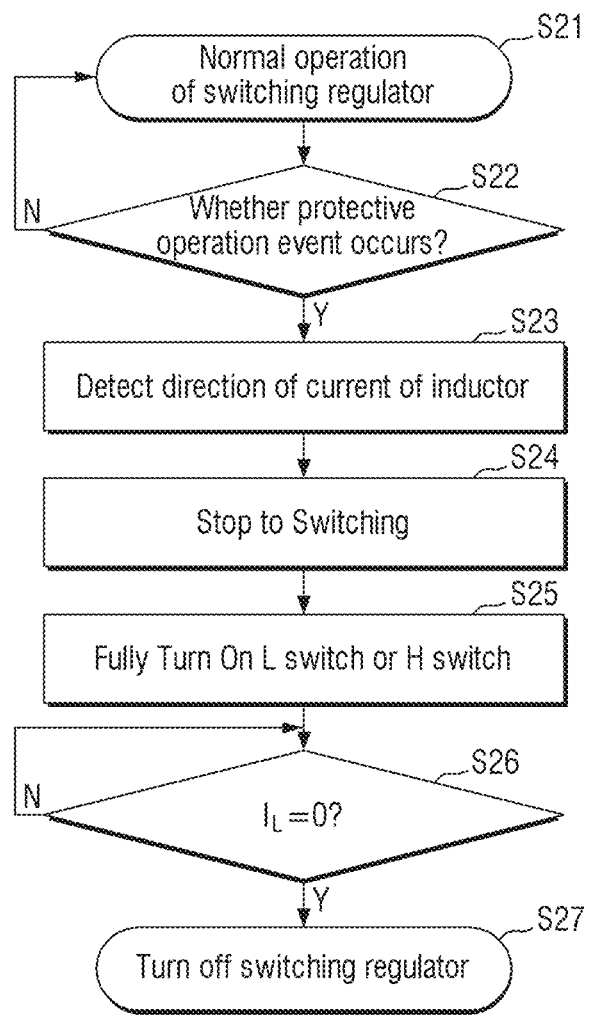

FIG. 8 and FIG. 9 are flowcharts illustrating a method of operating a switching regulator according to some example embodiments.

Referring to FIG. 8, the switching regulator 100 performs a normal operation such as voltage conversion in S11. When an event which requires (or alternatively, includes) a protective operation occurs during the normal operation in S22, the digital logic 30 and the switching regulator 100 perform the protective operation in S12. According to some example embodiments, the event requiring (or alternatively, including) the protective operation may include at least one of output overcurrent, output negative overcurrent, output low voltage, input overvoltage, or input low voltage.

The digital logic 30 monitors the inductor current of the switching regulator 100. For example, when a protective operation event for the switching regulator 100 occurs, the digital logic 30 detects a direction of the inductor current in S13 and the switching regulator 100 immediately stops a switching operation in S14.

For example, the digital logic 30 identifies whether the inductor overcurrent is positive overcurrent or negative overcurrent and controls the operation of the switching regulator 100 based on the identifying result. The switching regulator 100 may turn off the P-type transistor or turn off the N-type transistor under the control of the digital logic 30, that is, based on the detected inductor current direction in S15.

When the inductor current is positive overcurrent (OCP), the switching controller of the switching regulator 100 may turn off the P-type transistor 111 among the two transistors 111 and 112 and may fully turn on the N-type transistor 112 among the two transistors 111 and 112. When the inductor current is negative overcurrent (NOCP), the switching controller of the switching regulator 100 may turn off the N-type transistor 112 among the two transistors 111 and 112, and may fully turn on the P-type transistor 111 among the two transistors 111 and 112 in S15.

The switching controller of the switching regulator 100 counts a debounce time from a time point when the switching operation is stopped. When the debounce time is greater than a preset (or alternatively, desired) time (e.g., greater than a time threshold) TH T (Y in S16), the digital logic 30 entirely turns off the switching regulator 100 in S17. That is, the switching controller turns off the switching circuit of the switching regulator 100, that is, both the P-type transistor and the N-type transistor.

Referring to FIG. 9 according to another example embodiment, steps S21 to S25 are the same as the steps S11 to S15 of FIG. 8, and thus, description thereof is omitted. However, in the example embodiment of FIG. 9, the digital logic 30 monitors the inductor current level in S26. When the inductor current level is detected as 0 A ($I_L$=0) (Y in S26), the switching controller of the switching regulator 100 fully turns off the switching circuit in S27.

Figure 10:
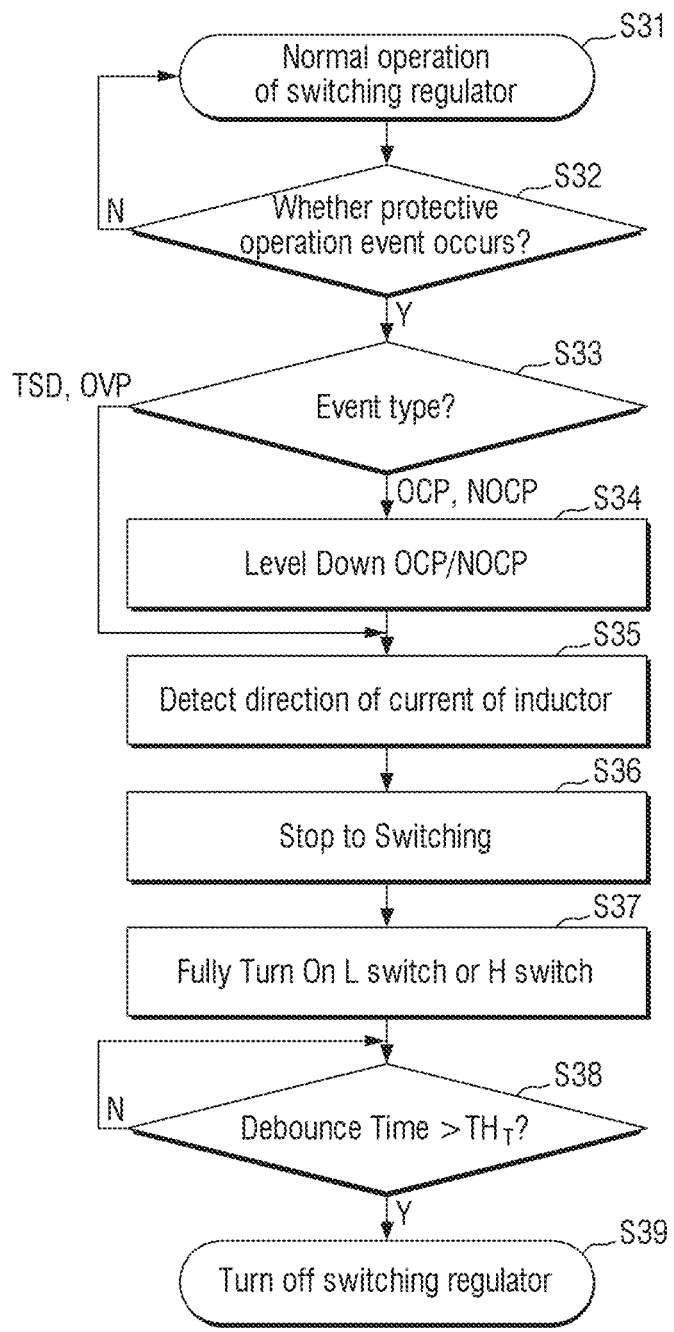
FIG. 10 and FIG. 11 are flowcharts illustrating a method of operating a switching regulator according to some example embodiments.
Figure 11:
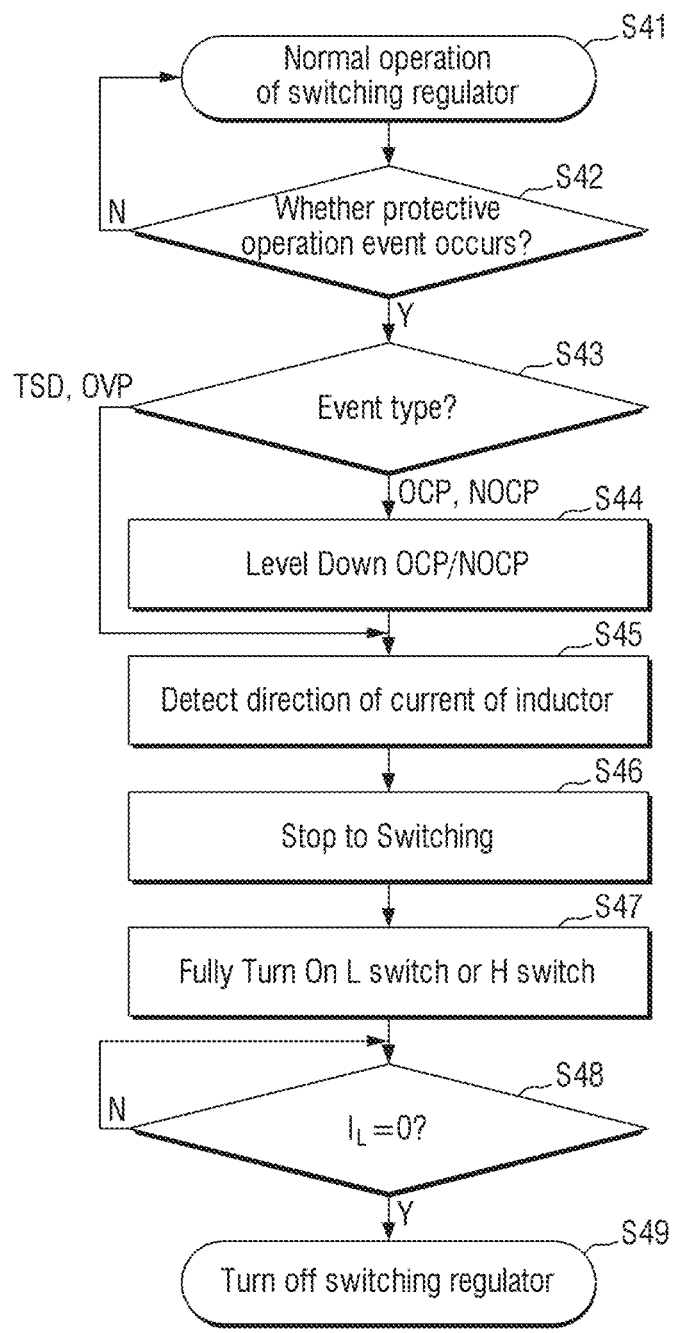

FIG. 10 and FIG. 11 are flowcharts illustrating a method of operating a switching regulator according to some example embodiments.

Referring to FIG. 10, the switching regulator 100 performs a normal operation such as voltage conversion in S31. When an event (hereinafter, referred to as a protective operation event) that requires (or alternatively, includes) a protective operation occurs during the normal operation (Y in S32), the digital logic 30 perform the protective operation on the switching regulator 100.

According to some example embodiments, when an event requiring (or alternatively, including) a protective operation occurs, the digital logic 30 identifies an event type in S33. For example, the event that requires (or alternatively, includes) the protective operation may include output positive overcurrent OCP_out and output negative overcurrent NOCP_out at the output node No, thermal shutdown, output low voltage UVP at an output element (for example, a switching transistor at an output terminal thereof), or input overvoltage OVP_in.

The digital logic 30 may control the protective operation of the switching regulator 100 depending on the event type. For example, a first event type is that a current operation temperature of the switching regulator 100 exceeds a thermal shutdown level (TSD level), or the input overvoltage Vi is greater than the OVP level or the output low voltage Vo is lower than an UVP level. When the event type is the first event type in S33, the inductor current direction is detected in S35 and the switching operation is immediately stopped in S36.

A second event type is that the output positive overcurrent OCP or the output negative overcurrent NOCP occurs in the switching regulator 100. When the second event type occurs, the positive overcurrent level or negative overcurrent level is lowered in S34, and the inductor current direction is detected in S35 and the switching operation is stopped in S36. The switching regulator 100 may lower the positive overcurrent level or negative overcurrent level to reduce ab amount of current flowing into the body diode of the transistor 111 or 112. Thereafter, the digital logic 30 detects the direction of the inductor current in S45 and the switching regulator 100 immediately stops the switching operation in S36.

The digital logic 30 may identify whether the overcurrent based on the inductor current direction detected in S35 is positive overcurrent OCP or negative overcurrent NCOP and may control the operation of the switching regulator 100 based on the identifying result. The switching regulator 100 may fully turn on the P-type transistor or the N-type transistor to discharge the residual current, under the control of the digital logic 30, that is, based on the detected inductor current direction in S37.

For example, when the inductor current is positive overcurrent OCP, the switching controller of the switching regulator 100 may turn off the P-type transistor 111 and fully turn on the N-type transistor 112. When the inductor current is negative overcurrent NOCP, the switching controller of the switching regulator 100 may turn off the N-type transistor 112, and may fully turn on the P-type transistor 111 in S37.

The switching regulator 100 waits until the debounce time counted after the switching operation is stopped exceeds the preset (or alternatively, desired) time TH T (Y in S38), and then fully turns off the switching circuit of the switching regulator 100 in S39.

Referring to FIG. 11 according to another example embodiment, steps S41 to S47 are the same as the steps S31 to S37 of FIG. 10, and thus description thereof is omitted. However, in the example embodiment of FIG. 11, the digital logic 30 may control the switching operation based on not the debounce time but an inductor current level. For example, the digital logic 30 may monitor the inductor current level $I_L$. When the inductor current level is detected as 0 A ($I_L$=0) (Y in FIG. 48), the digital logic 30 entirely turns off the switching regulator 100 in S49.

Figure 12:
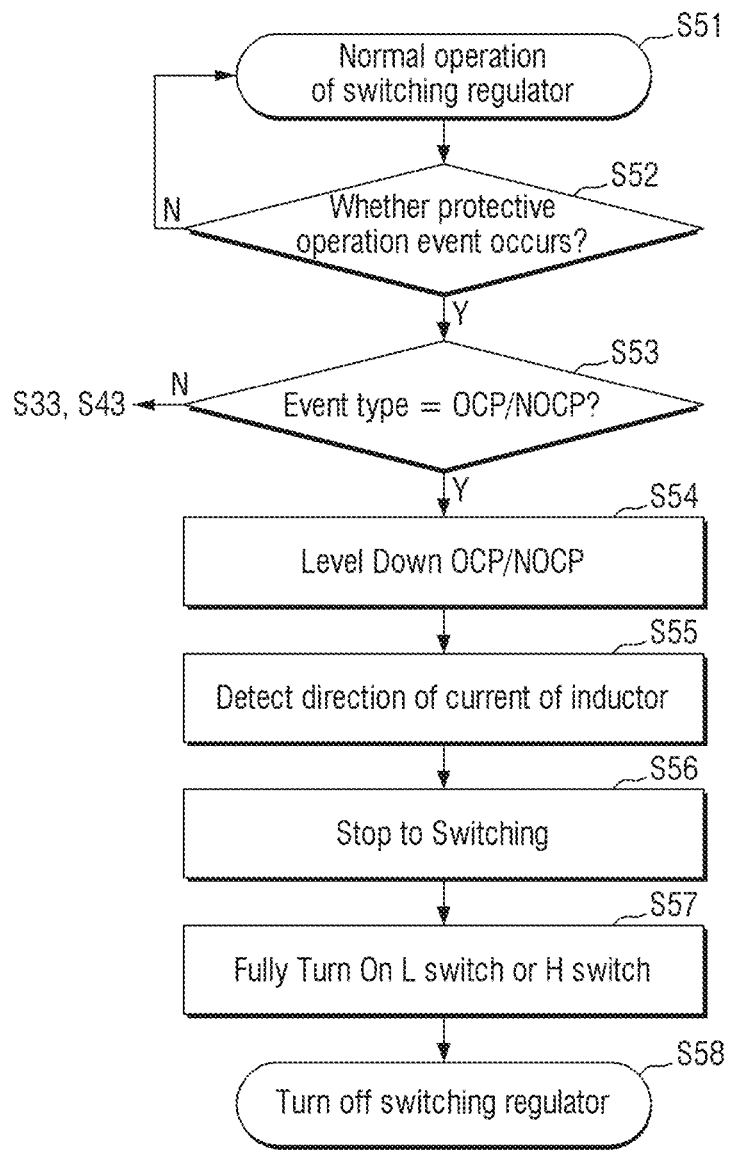
FIG. 12 is a flowchart illustrating a method for operating a switching regulator according to some example embodiments.

FIG. 12 is a flowchart illustrating a method for operating a switching regulator according to some example embodiments. For convenience of description, descriptions duplicate with those set forth above using FIG. 10 and FIG. 11 are omitted.

Referring to FIG. 12, when an event requiring (or alternatively, including) the protective operation occurs, the digital logic 30 identifies an event type in S52. For example, the event that requires (or alternatively, includes) the protective operation may include output positive overcurrent OCP_out and output negative overcurrent NOCP_out at the output node No, thermal shutdown, output low voltage UVP at an output element (for example, a switching transistor at an output terminal thereof), or input overvoltage OVP_in.

For example, when output positive overcurrent OCP_out or output negative overcurrent NOCP_out occurs in the switching regulator 100 in S53, the digital logic 30 may lower the positive overcurrent level or negative overcurrent level in S54 to reduce an amount of current flowing into the body diode of the transistor 111 or 112 to turn off the switching regulator 100 stably.

Thereafter, the digital logic 30 detects the inductor current direction in S55 and stops the switching operation in S56. Thereafter, the digital logic 30 may turn off the switching regulator without measuring the debounce time or the inductor current level as shown in FIG. 11 or FIG. 12 in S58.

Alternatively, for example, when the thermal shutdown or the input overvoltage OVP occurs in the switching regulator 100, the digital logic 30 may detect the inductor current direction in S35 or S45 and stop the switching operation in S36 or S46, as described in FIG. 10. Depending on the detected inductor current direction, one of the P-type transistor 111 and the N-type transistor 112 is fully turned on while the other thereof is turned off in S37 or S47. Thereafter, the switching regulator 100 waits until the debounce time counted after the switching operation is stopped exceeds the preset (or alternatively, desired) time $TH_T$ (Y in S38), or the inductor current level is detected as 0 A ($I_L$=0) (Y in S48), and then fully turns off the switching circuit of the switching regulator 100 in S39 or S49.

Figure 13:
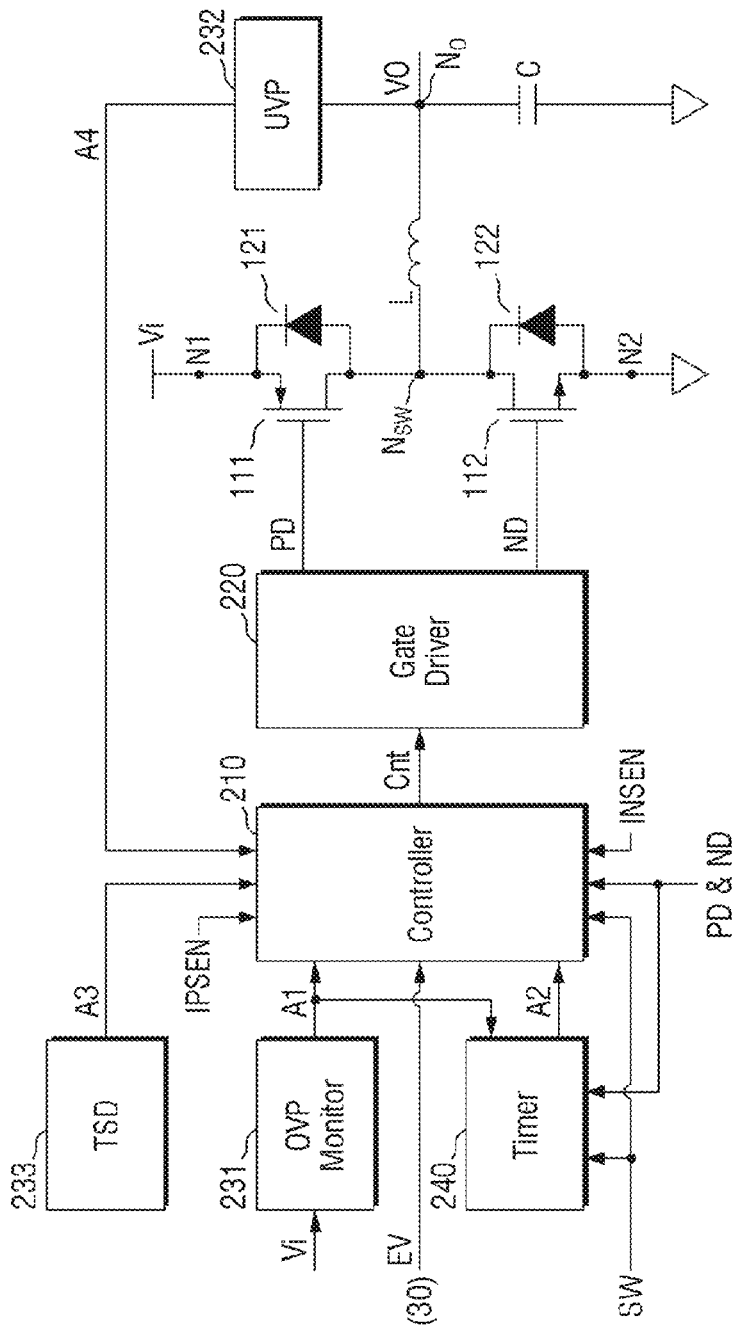
FIG. 13 is a circuit diagram showing a switching regulator according to some example embodiments.

FIG. 13 is a circuit diagram showing a switching regulator according to some example embodiments.

Referring to FIG. 13, a switching regulator 200 includes a switching controller 210, a gate driver 220, an input voltage monitor 231, an output voltage monitor 232, a thermal shutdown detector (TSD) 233, a timer 240 and a switching circuit 111, 112, 121, 122, and L.

Upon receiving the enable signal EN from the digital logic 30, the switching controller 210 generates a target voltage Vtarget of the switching regulator 200 outputs an output control signal Cnt based on the target voltage. The switching controller 210 may receive monitoring signals from other components 220, 231, 232, 233, 240, 111, 112, 121, 122, and L. The switching regulator 200 may output the monitoring signals (the M signals of FIG. 1) to the digital logic 30.

The monitoring signal is used for determining whether the event requiring (or alternatively, including) the protective operation occurs. The monitoring signal may include, for example, an input overvoltage detection signal OVP_in (A1), an input low voltage detection signal UVP_in (A1), an output positive overcurrent detection signal IPSEN (a current between N1 and $N_{SW}$), an output negative overcurrent signal INSEN (a current between N2 and $N_{SW}$), an elapsed time detection signal A2 indicating an elapsed time after event occurrence, an overheat prevention detection signal A3, an output low voltage detection signal A4, or an inductor current $I_L$.

The gate driver 220 generates and outputs the gate signals PD and ND respectively input to the gates of the switching circuit 112 and 112 according to the output control signal Cnt of the switching controller 210.

The input voltage monitor 231 monitors the input voltage Vi received by the switching regulator 200. That is, the input voltage monitor 231 is connected to an input of the switching controller 210, compares the monitored input voltage Vi with a preset (or alternatively, desired) overvoltage level (OVP level), and outputs the input overvoltage detection signal A1 based on a result of the comparison to the switching controller 210.

The output voltage monitor 232 monitors the output voltage Vo output from the switching regulator 200. For example, the output voltage monitor 232 may compare the output voltage Vo with a preset (or alternatively, desired) low voltage level (UVP level), and output the output low voltage detection signal A4 based on the comparison result to the switching controller 210.

The timer 240 measures the debounce time that has elapsed after the switching operation is stopped because the switching transistors are turned off based on the gate signals PD and ND. For example, the timer 240 receives a signal SW of the switching node $N_{SW}$ and the first and second gate signals PD and ND and outputs the elapsed time detection signal A2 to the switching controller 210. The switching controller 210 may calculate the debounce time based on the gate signals PD and ND and the elapsed time detection signal A2.

According to some example embodiments, when the input overvoltage Vi is higher than the OVP level, the input voltage monitor 231 detects an increase in the input voltage Vi, and outputs the input overvoltage detection signal A1 to the switching controller 210. When the switching controller 210 receives the input overvoltage detection signal A1, the switching controller 210 detects the direction of the inductor current $I_L$ based on the gate signals PD and ND, the output positive overcurrent detection signal IPSEN, the output negative overcurrent detection signal INSEN, and the switching signal SW (a $N_{SW}$ node signal). In this regard, the output positive overcurrent and negative overcurrent states may be respectively detected based on the current IPSEN between the switching node $N_{SW}$ and the input node (the source terminal of the P-type transistor 111, that is, the N1 node) and the current INSEN between the switching node $N_{SW}$ and the ground node (the source terminal of the N-type transistor 112, that is, the N2 node). The switching controller 210 detects the direction of the inductor current $I_L$ based on the output overcurrent/negative overcurrent detection signals IPSEN and INSEN and stops the switching operation of the switching circuit 111 and 112.

According to some example embodiments, when the positive output positive overcurrent or output negative overcurrent occurs as the protective operation event, the switching controller 210 detects the direction of the inductor current $I_L$ based on a signal between the N1 node and the $N_{SW}$ node or a signal between the N2 node and $N_{SW}$ node signal, and the switching signal SW. The switching controller 210 detects the direction of the inductor current $I_L$ based on the signal between the N1 node and the $N_{SW}$ node or the signal between the N2 node and $N_{SW}$ node signal, and the switching signal SW and stops the switching operation of the switching circuit 111 and 112.

The overheat prevention detector 240 outputs the overheat prevention detection signal A3 to the switching controller 210. The overheat prevention detector 240 senses the current operation temperature of the switching regulator, and compares the sensed current operation temperature with a preset (or alternatively, desired) overheat prevention level (TSD level), and generates the overheat prevention detection signal A3 based on the comparing result.

According to some example embodiments, the switching controller 210 may monitor the residual current of the inductor based on the overheat prevention detection signal A3, the output positive overcurrent signal IPSEN based on the voltage between the N1 node and the $N_{SW}$ node or the output negative overcurrent signal INSEN based on the voltage between the N2 node and the $N_{SW}$ node. For example, the switching controller 210 detects the direction of the inductor current $I_L$ based on the voltage between the N1 node and the $N_{SW}$ node or the voltage between the N2 node and the $N_{SW}$ node and then stops the switching operation of the switching circuit 111 and 112.

According to some example embodiments the switching controller 210 detects the positive overcurrent level (OCP level) or negative overcurrent level (NOCP level) at an output of the regulator, based on the overheat prevention detection signal A3, the output positive overcurrent detection signal IPSEN, the output negative overcurrent signal INSEN, and the output low voltage detection signal UVP (A4). Then, the switching controller 210 lowers the detected positive overcurrent level or the detected negative overcurrent current level, and detects the direction of the inductor current $I_L$, and then stops the switching operation of the switching circuit 111 and 112.

The switching controller 210 generates the output control signal Cnt based on these monitoring signals. The gate driver 220 generates the gate signals PD and ND based on the output control signal Cnt. For example, the gate driver 220 may fully activate only the gate signal PD or only the gate signal ND based on the detected inductor current direction. Upon receiving the elapsed time detection signal A2, the switching controller 210 may fully deactivate the gate signals PD and ND so that the switching regulator is turned off.

Figure 14:
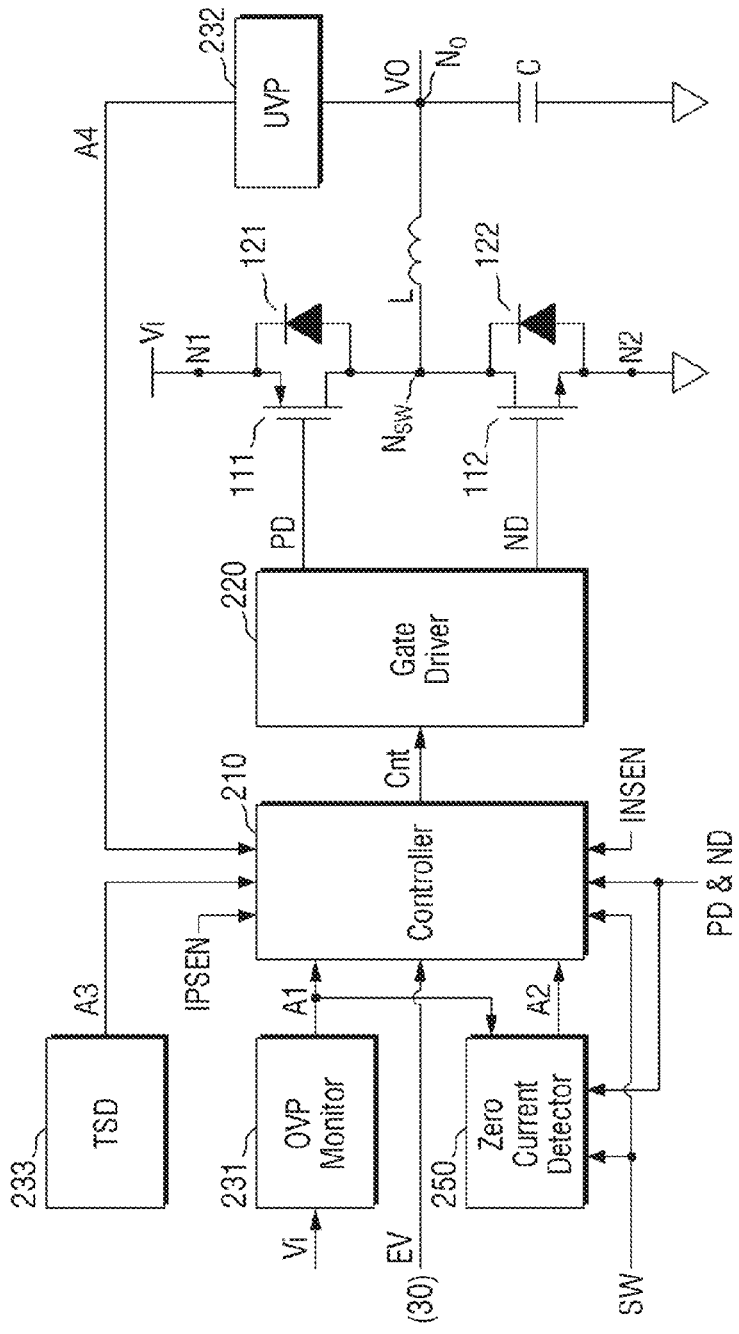
FIG. 14 is a circuit diagram showing a switching regulator according to some example embodiments.

FIG. 14 is a circuit diagram showing a switching regulator according to some example embodiments. For the convenience of description, the following description is mainly based on differences thereof from those set forth above using FIG. 13, and duplicate description thereof is omitted.

The switching regulator 200 in FIG. 14 may include a current detector 250 instead of the timer 240 in FIG. 13.

The current detector 250 monitors the gate signals PD and ND, the input overvoltage detection signal A1, and the inductor current $I_L$ at the switching node $N_{SW}$. When the inductor current reaches 0 A ($I_L$=0), the current detector 250 may output a discharge completion detection signal A2 to the switching controller 210.

Figure 15A:
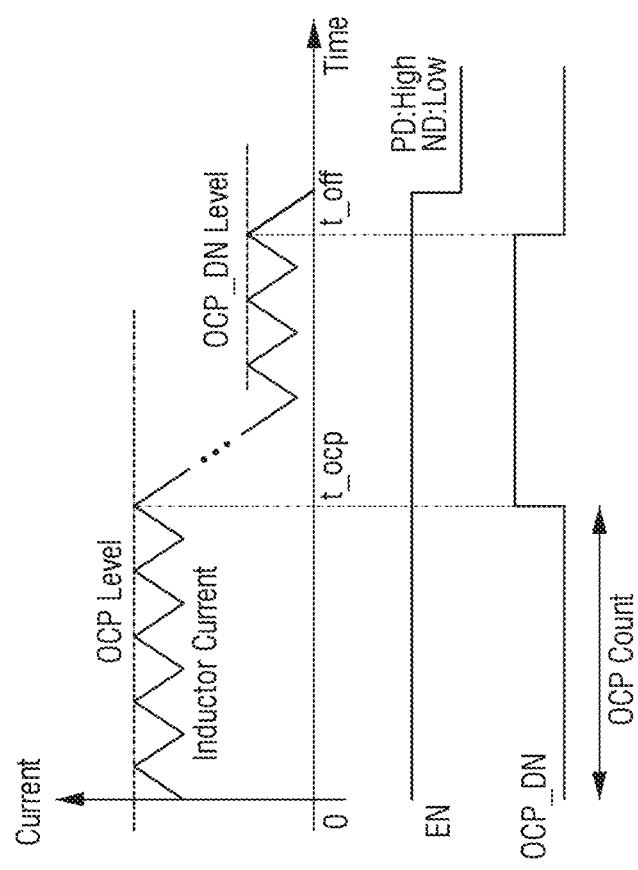
FIG. 15A and FIG. 15B are timing diagrams showing an operation of a switching regulator circuit in a positive overcurrent or negative overcurrent state.
Figure 15B:
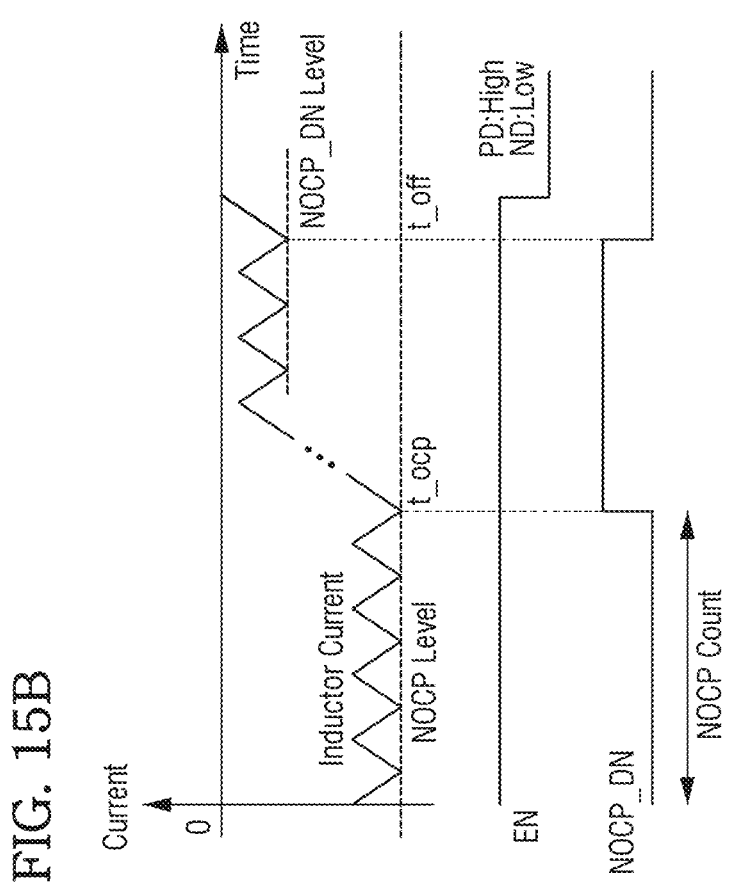

FIG. 15A and FIG. 15B are timing diagrams showing an operation of a switching regulator circuit in a positive overcurrent or negative overcurrent state.

Referring to FIG. 13 and FIG. 15A together, when the inductor current level detected based on the voltage between the N1 node and the $N_{SW}$ node or the voltage between the N2 node and the $N_{SW}$ node is detected as the positive overcurrent level (OCP level), the switching controller 210 lowers the positive overcurrent level $I_L$ of the inductor for a predefined (or alternatively, desired) time duration in S34.

For example, when the inductor current $I_L$ is detected as the positive overcurrent level (OCP level) for a predetermined (or alternatively, desired) time duration t_ocp, the switching controller 210 activates a level down signal OCP_DN (OCP_DN=High) for a predefined (or alternatively, desired) time duration THT=(t_ocp−t_off) to lower the positive overcurrent level to a predefined (or alternatively, desired) level. For example, the level of the inductor current $I_L$ is lowered by continuously switching on/off the P-type transistor 111 and the N-type transistor 112. When the level of the inductor current $I_L$ is lowered to a predefined (or alternatively, desired) positive overcurrent level (OCP_DN level), the switching controller may fully turn on the N-type transistor 112 to discharge the residual current to the ground terminal VSS. When the inductor current $I_L$ is entirely discharged at t_off ($I_L$=0), the switching regulator is deactivated (EN=Low).

Thereafter, steps S35 to S39 are the same as S13 to S17 in FIG. 8.

Referring to FIG. 13 and FIG. 15B together, when the inductor current level detected based on the voltage between the N1 node and the $N_{SW}$ node or the voltage between the N2 node and the $N_{SW}$ node is detected as the negative overcurrent level (NOCP level), the switching controller 210 lowers the negative overcurrent level of the inductor for a predefined (or alternatively, desired) time duration in S44.

For example, when the inductor current IL is detected as the negative overcurrent level (NOCP level) for a predetermined (or alternatively, desired) time duration t_ocp, the switching controller 210 activates a level down signal NOCP_DN (NOCP_DN=High) for a predefined (or alternatively, desired) time duration $TH_T$=(t_ocp−t_off) to raise the negative overcurrent level to a predefined (or alternatively, desired) level. For example, the level of the inductor current IL is controlled by continuously switching on/off the P-type transistor 111 and the N-type transistor 112. When the level of the inductor current $I_L$ rises to a predefined (or alternatively, desired) negative overcurrent level (NOCP_DN level), the switching controller may fully turn on the P-type transistor 111 to discharge the residual current to the input terminal Vi. When the inductor current $I_L$ has been entirely discharged at t_off ($I_L$=0), the switching regulator is deactivated (EN=Low).

Thereafter, steps S45 to S49 are the same as S23 to S27 in FIG. 9.

For example, the digital logic 30 identifies whether the entirety of the residual current has been discharged, based on the output positive overcurrent detection signal IPSEN or the output negative overcurrent detection signal INSEN. Upon determination that the entirety of the residual current has been discharged, the digital logic 30 may change the enable signal EN from a logic high to a logic low, and may generate the output control signal Cnt. The gate driver 220 turns off the P-type transistor 111 and the N-type transistor 112 based on the output control signal Cnt (PD high, and ND low) and entirely turns off the switching regulator 200.

As described in FIG. 15A and FIG. 15B, the positive overcurrent or negative overcurrent level of the inductor is lowered and then the current is discharged and then the switching regulator 200 is tuned off. Thus, the switching regulator 200 may be turned off more stably without overheating thereof.

Figure 16A:
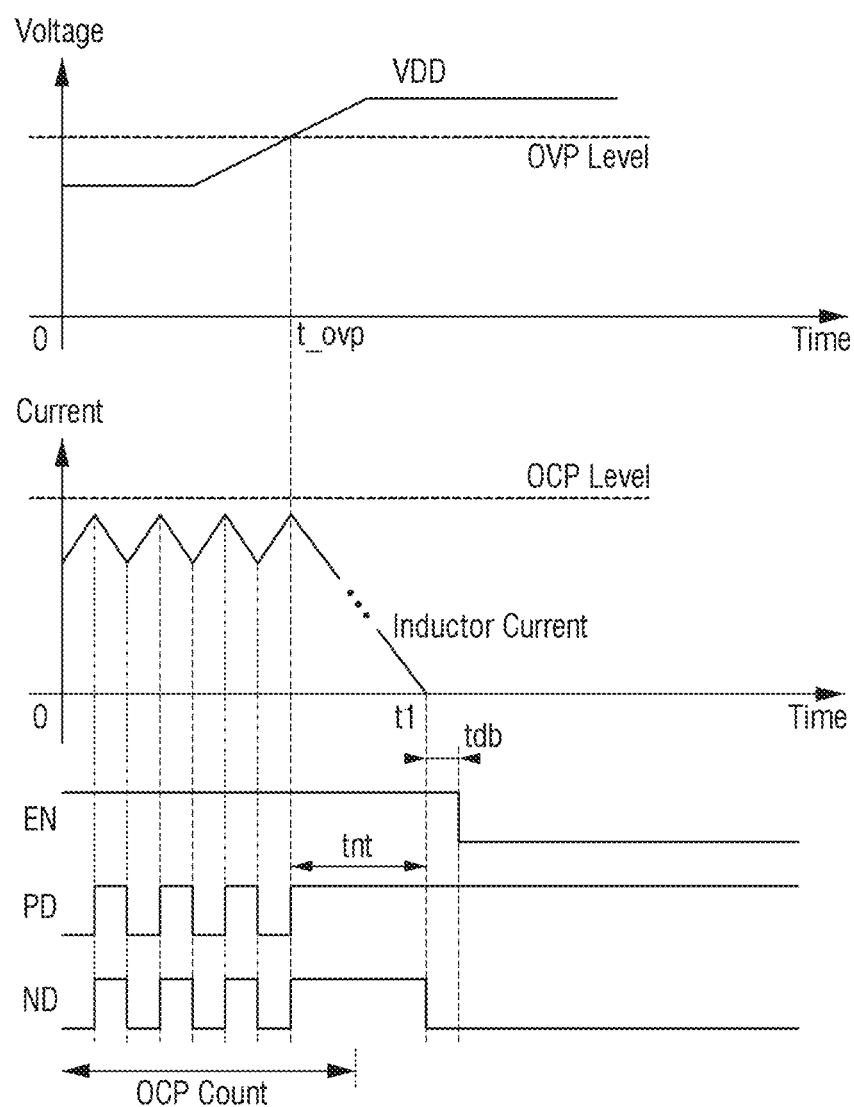
FIG. 16A and FIG. 16B are timing diagrams showing an operation of a switching regulator circuit in an input overvoltage state.
Figure 16B:
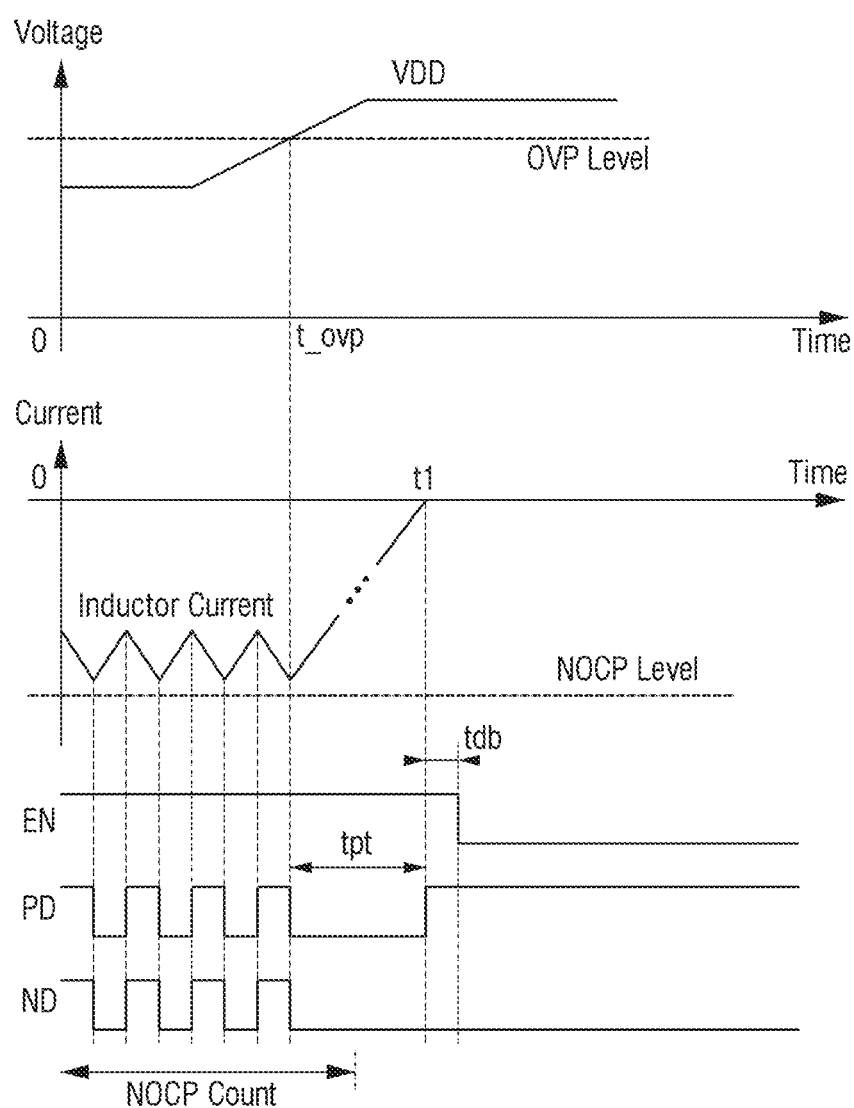

FIG. 16A and FIG. 16B are timing diagrams showing an operation of a switching regulator circuit in an input overvoltage state.

Referring to FIG. 13 and FIG. 16A, when the input voltage Vi to the switching regulator 200 exceeds an overvoltage level for a predetermined (or alternatively, desired) time duration t_ovp (Vi>OVP level), the switching controller 210 identifies whether the residual current $I_L$ of the inductor remains through the N1, $N_{SW}$, and N2 nodes. In FIG. 16A, the switching regulator is in a positive overcurrent state. Thus, when the switching controller 210 detects that the residual current $I_L$ remains, the switching controller 210 turns on the P-type transistor 111 or the N-type transistor 112 for a predefined (or alternatively, desired) time duration tnt to discharge the residual current through the turned-on transistor (for example, the N-type transistor 112 is turned on in the graph as shown).

Referring to FIG. 13 and FIG. 16B, when the input voltage Vi to the switching regulator 200 exceeds the overvoltage level for a predetermined (or alternatively, desired) time duration t_ovp (Vi>OVP level), the switching controller 210 identifies whether the residual current $I_L$ of the inductor remains through the N1, $N_{SW}$, and N2 nodes. In FIG. 16B, the switching regulator is in the negative overcurrent state (NCOP level). Thus, when the switching controller 210 detects that the residual current remains, the switching controller 210 turns on the P-type transistor 111 or the N-type transistor 112 for a predefined (or alternatively, desired) time duration tpt to discharge the residual current through the turned-on transistor (for example, the P-type transistor 111 is turned on in the graph as shown).

In FIG. 16A and FIG. 16B, the digital logic 30 may monitor the output positive overcurrent detection signal IPSEN based on the voltage between the N1 node and the $N_{SW}$ node voltage and may monitor the output negative overcurrent detection signal INSEN based on the voltage between the N2 node and the $N_{SW}$ node. The digital logic 30 may identify, based on the output positive overcurrent detection signal IPSEN, and the output negative overcurrent signal INSEN, whether a state in which the inductor current 0 A is maintained for a predefined (or alternatively, desired) time duration tdb. When the state in which the inductor current 0 A is maintained for the predefined (or alternatively, desired) time duration tdb, the digital logic 30 may change the enable signal EN from a logic high to a logic low. According to the enable signal EN, the P-type transistor 111 and the N-type transistor 112 are turned off (PD high and ND low) and the switching regulator 200 are entirely turned off.

According to some example embodiments, the digital logic 30 in FIG. 16A and FIG. 16B may monitor the inductor current for the predefined (or alternatively, desired) time duration tdb without immediately changing a logic state of the enable signal EN to a logic low even when the inductor current becomes 0 A. When the predefined (or alternatively, desired) time duration tdb has elapsed, the P-type transistor 111 and the N-type transistor 112 are turned off according to the enable signal EN (PD high and ND low) and the switching regulator 200 are entirely turned off. For example, when the inductor current flows in a reverse direction or the inductor current temporarily becomes 0 A, there is a possibility that the residual current still remains. Thus, the above action is intended to secure a discharge line safely.

Figure 17A:
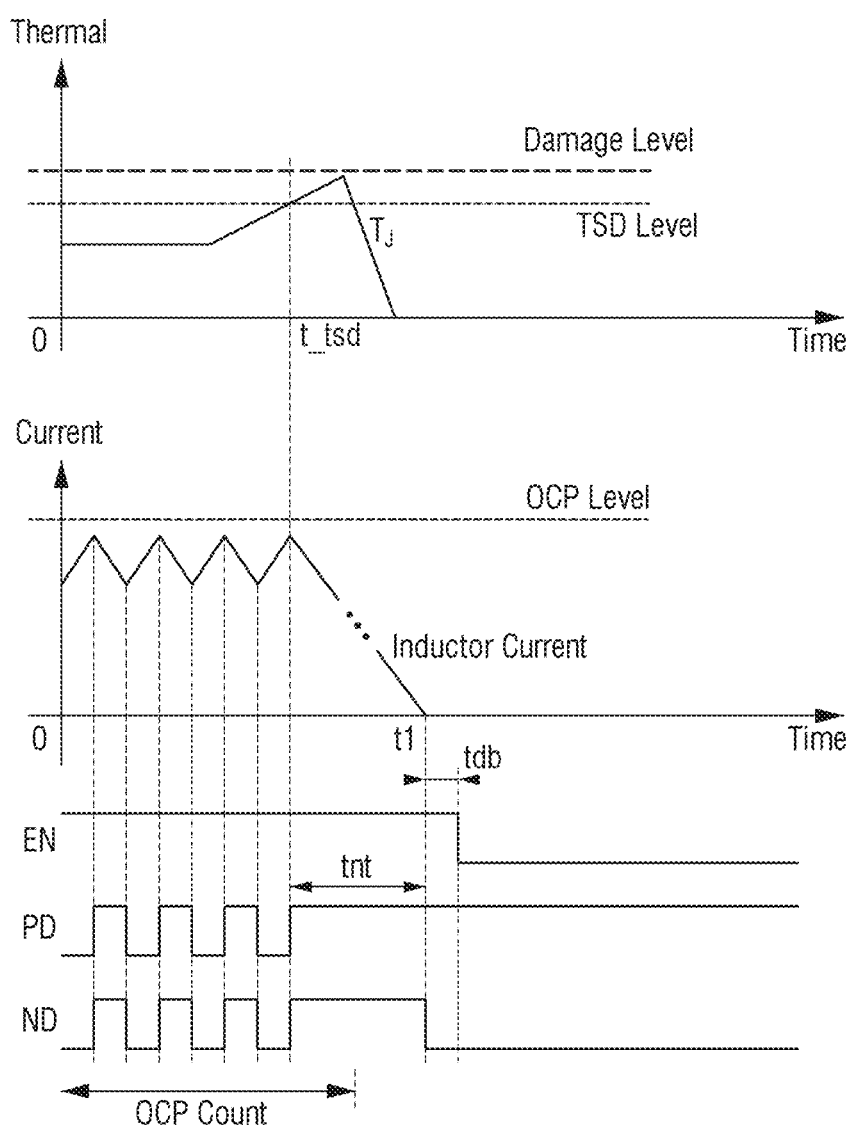
FIG. 17A and FIG. 17B are timing diagrams showing an operation of a switching regulator circuit in a thermal shutdown state.
Figure 17B:
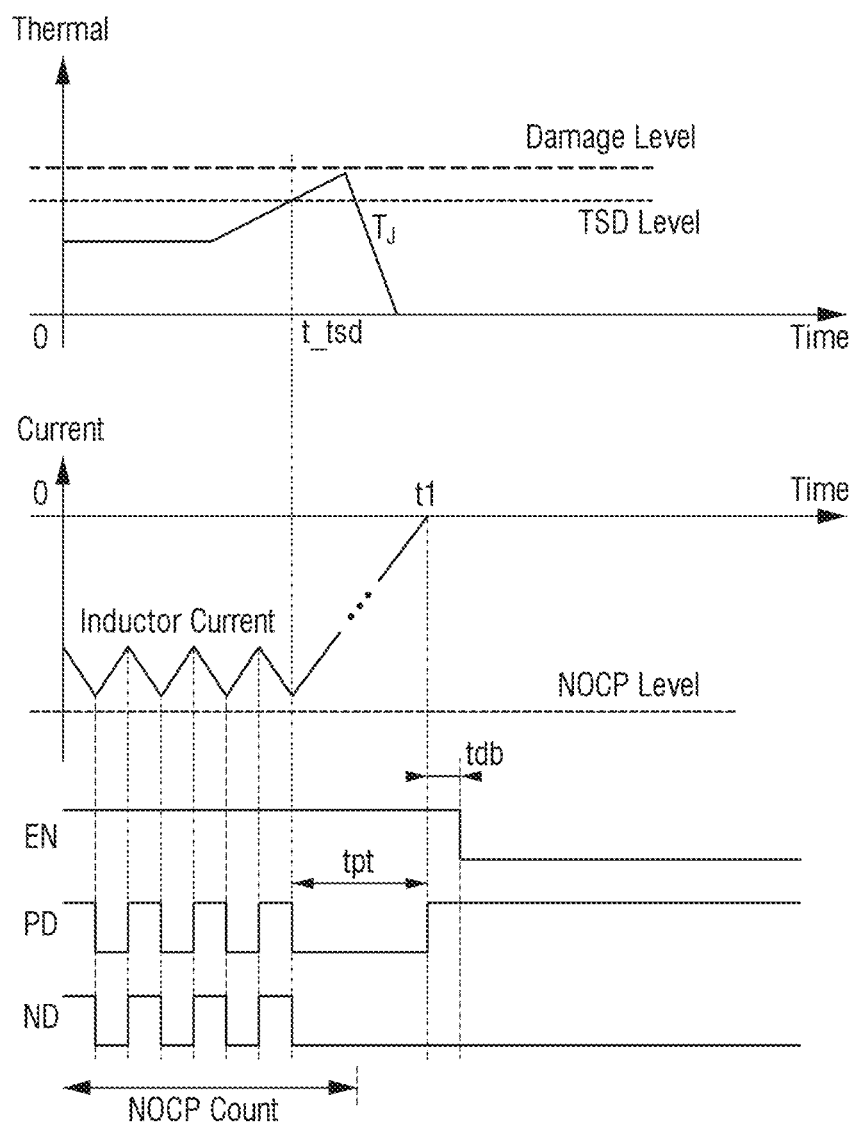

FIG. 17A and FIG. 17B are timing diagrams showing an operation of a switching regulator circuit in a thermal shutdown state.

Referring to FIG. 13 and FIG. 17A or 17B, the switching controller 210 monitors whether the current operation temperature of the switching regulator 200 exceeds the TSD level, based on the overheat prevention detection signal A3.

When the current operation temperature of the switching regulator 200 exceeds the TSD level (Thermal>TSD level), the switching controller 210 identifies whether the output positive overcurrent/negative overcurrent IPSEN/INSEN is present through the N1, $N_{SW}$, and N2 nodes. When the output positive overcurrent/negative overcurrent IPSEN/INSEN is present, the switching controller 210 may check the residual current.

In FIG. 17A, the switching regulator is at the positive overcurrent state (OCP level). Thus, when the switching controller 210 determines that residual current remains, the switching controller 210 turns on the N-type transistor 112 (ND High) for the predefined (or alternatively, desired) time duration tnt to discharge the residual current. In FIG. 17B, the switching regulator is at the negative overcurrent state (NCOP level). Thus, when the switching controller 210 determines that the residual current remains, the switching controller 210 turns on the P-type transistor 111 (PD Low) for the predefined (or alternatively, desired) time duration tpt to discharge the residual current.

The digital logic 30 determines, based on the output positive overcurrent detection signal IPSEN (the N1 node signal), and the output negative overcurrent signal INSEN (the N2 node signal), whether the state in which the inductor current is 0 A is maintained for the predefined (or alternatively, desired) time tdb after the entirety of the inductor current has been discharged ($I_L=0$). When the state in which the inductor current is 0 A is maintained for the predefined (or alternatively, desired) time tdb, the digital logic 30 changes a logic state of the enable signal EN from a logic high to a logic low. According to the enable signal EN, the P-type transistor 111 and the N-type transistor 112 are turned off (PD high and ND low) and the switching regulator 200 are entirely turned off.

In the example embodiments of FIG. 1 to FIG. 17B, a case where the switching regulator is embodied as the buck converter has been described by way of example. However, the present disclosure is not limited thereto. The principle of the present disclosure may be applied to a case where the switching regulator is embodied as each of the boost converter and the buck-boost converter.

Although the example embodiments of the present disclosure have been described above with reference to the accompanying drawings, the present disclosure may not be limited to the example embodiments and may be implemented in various different forms. Those of ordinary skill in the technical field to which the present disclosure belongs will be able to understand that the present disclosure may be implemented in other specific forms without changing the technical idea or essential features of the present disclosure. Therefore, it should be understood that the example embodiments as described above are not restrictive but illustrative in all respects.

What is claimed is:

1. A switching regulator comprising:
   a switching controller configured to activate a switching conversion operation based on an enable signal;
   a gate driver configured to generate a first gate signal and a second gate signal under control of the switching controller; and
   a switching circuit configured to convert an input voltage applied to an input voltage node to an output voltage, the switching circuit including
      a P-type transistor connected between the input voltage node and a switching node and gated based on the first gate signal,
      an N-type transistor connected between the switching node and a power ground terminal and gated based on the second gate signal, and
      an inductor connected between the switching node and an output node and configured to output the output voltage,
   wherein in response to a protective operation event occurring in the switching regulator, the switching controller is configured to
      detect a direction of a current of the inductor,
      stop a switching operation of the switching circuit,
      discharge a residual current of the inductor, and
      entirely turn off the switching regulator.

2. The switching regulator of claim 1, wherein the protective operation event includes at least one of output positive overcurrent, output negative overcurrent, output low voltage, input overvoltage and output low voltage of the switching regulator.

3. The switching regulator of claim 1, wherein the switching controller is configured to:
   fully turn on the P-type transistor or the N-type transistor to discharge the residual current in response to the current of the inductor exceeding a positive overcurrent level or a negative overcurrent level.

4. The switching regulator of claim 3, wherein the switching controller is configured to:
   count a debounce time from a time point at which the switching operation of the switching circuit is stopped;
   fully turn off the switching circuit in response to the counted debounce time being greater than a time threshold.

5. The switching regulator of claim 3, wherein the switching controller is configured to:
   fully turn off the switching circuit in response to the residual current of the inductor being fully discharged.

6. The switching regulator of claim 1, wherein in response to the input voltage exceeding a overvoltage level or a current operation temperature of the switching regulator exceeding a thermal shutdown level, the switching controller is configured to:
   detect the direction of the current of the inductor; and
   fully turn on the P-type transistor or the N-type transistor based on the detected direction to discharge the residual current.

7. The switching regulator of claim 6, wherein in response to a current level of the inductor exceeding a positive overcurrent level or a negative overcurrent level, the switching controller is configured to:
   lower the positive overcurrent level or the negative overcurrent level;
   detect the current level and a current direction of the inductor; and
   fully turn on the P-type transistor or the N-type transistor based on the detected direction to discharge the residual current.

8. The switching regulator of claim 7, wherein the lowering of the positive overcurrent level or the negative overcurrent level includes continuously switching on/off the P-type transistor and the N-type transistor such that the current level of the inductor is adjusted to the positive overcurrent level or the negative overcurrent level.

9. The switching regulator of claim 1, further comprising a thermal shutdown detector configured to:
   sense a current operation temperature of the switching regulator;
   compare the sensed current operation temperature with a overheat prevention level; and
   output an overheat prevention detection signal based on the comparing result.

10. The switching regulator of claim 1, further comprising an input voltage monitor connected to an input of the switching regulator,
   wherein the input voltage monitor is configured to compare the input voltage with a overvoltage level, and output an input overvoltage detection signal to the switching controller based on the comparing result.

11. The switching regulator of claim 1, wherein the switching controller is configured to:
- monitor an output positive overcurrent detection signal based on a voltage between a source terminal of the P-type transistor and the switching node;
- monitor an output negative overcurrent detection signal based on a voltage between a source terminal of the N-type transistor and the switching node; and
- detect the residual current of the inductor based on the output positive overcurrent detection signal and the output negative overcurrent detection signal.

12. The switching regulator of claim 1, further comprising:
- a timer configured to receive a signal of the switching node, the first gate signal and the second gate signal and to output an elapsed time detection signal.

13. The switching regulator of claim 1, wherein the switching regulator is connected to a digital logic, wherein the digital logic is configured to receive a monitoring signal, generate the enable signal based on the monitoring signal, and output the generated enable signal to the switching controller.

14. A switching regulator comprising:
- a switching controller configured to be activated based on an enable signal; and
- a switching circuit including a P-type transistor and an N-type transistor, the switching circuit being configured to convert an input voltage to a target output voltage under control of the switching controller,
- wherein the switching controller is configured to
  - monitor whether a protective operation event occurs,
  - detect a direction of a current of an inductor of the switching circuit in response to the protective operation event occurring,
  - stop a switching operation of the switching circuit,
  - fully turn on the P-type transistor or the N-type transistor based on the detected direction, and
  - deactivate the enable signal in response to the current of the inductor being fully discharged.

15. The switching regulator of claim 14, wherein the switching controller is configured to:
- lower a positive overcurrent level or a negative overcurrent level in response to the level of the current of the inductor exceeding the positive overcurrent level or exceeding the negative overcurrent level;
- monitor an output positive overcurrent detection signal based on a voltage between a source terminal of the P-type transistor and a switching node;
- monitor an output negative overcurrent detection signal based on a voltage between a source terminal of the N-type transistor and the switching node; and
- detect the direction of the current of the inductor based on the output positive overcurrent detection signal and the output negative overcurrent detection signal.

16. The switching regulator of claim 14, wherein the switching controller is configured to:
- count a debounce time after the P-type transistor or the N-type transistor has been fully turned on; and
- fully turn off the switching regulator in response to the debounce time exceeding a time threshold.

17. The switching regulator of claim 14, wherein the switching controller is configured to:
- fully turn off the switching regulator in response to a time duration having elapsed from a time at which the current of the inductor becomes 0 by fully turning on the P-type transistor or the N-type transistor.

18. A power management integrated circuit comprising:
- a power supply configured to generate an input voltage based on an external voltage;
- a digital logic configured to generate an enable signal based on monitoring signals;
- a switching regulator configured to convert the input voltage to an output voltage based on the enable signal, and to output the monitoring signals,
- wherein the switching regulator is configured to
  - monitor whether a protective operation event occurs,
  - detect a direction of a current of an inductor of a switching circuit of the switching regulator when the protective operation event occurs,
  - stop a switching operation of the switching circuit,
  - discharge a residual current of the inductor, and
  - turn off the switching regulator.

19. The power management integrated circuit of claim 18, wherein the switching regulator is configured to:
- lower a current level of the inductor in response to a level of the current of the inductor exceeding a positive overcurrent level or a negative overcurrent level; and
- detect the direction of the current of the inductor.

20. The power management integrated circuit of claim 19, wherein the lowering of the current level of the inductor is configured to,
- continuously switch on/off a P-type transistor and a N-type transistor of the switching circuit such that a current level of the inductor is adjusted to a positive overcurrent level or a negative overcurrent level.

* * * * *